US012607277B2

(12) United States Patent　　　　(10) Patent No.:　　US 12,607,277 B2
Adams et al.　　　　　　　　　　　(45) Date of Patent:　　　Apr. 21, 2026

(54) MECHANICALLY LOCKED ACTUATOR SYSTEM AND METHOD

(71) Applicant: Baker Hughes Pressure Control LLC, Houston, TX (US)

(72) Inventors: Keith Adams, Katy, TX (US); Lauren Valera, Houston, TX (US); Javier Garcia, Houston, TX (US)

(73) Assignee: Baker Hughes Pressure Control LLC, Houston, TX (US)

( * ) Notice: Subject to any disclaimer, the term of this patent is extended or adjusted under 35 U.S.C. 154(b) by 107 days.

(21) Appl. No.: 18/390,973

(22) Filed: Dec. 20, 2023

(65) Prior Publication Data

US 2025/0207685 A1　　Jun. 26, 2025

(51) Int. Cl.
　　*F16K 31/56*　　　　(2006.01)
　　*E21B 29/04*　　　　(2006.01)
(52) U.S. Cl.
　　CPC .............. *F16K 31/56* (2013.01); *E21B 29/04* (2013.01)
(58) Field of Classification Search
　　CPC ... F16K 31/56; F16K 1/00; F16K 3/02; F16K 2200/302; E21B 29/04; E21B 33/061; E21B 33/062; E21B 33/063; E21B 29/08; B26D 5/12
　　USPC .............. 251/1.3, 63.6, 61.5, 337, 176, 227
　　See application file for complete search history.

(56) References Cited

U.S. PATENT DOCUMENTS

| | | | |
|---|---|---|---|
| 4,135,547 A | 1/1979 | Akkerman et al. | |
| 4,199,131 A | 4/1980 | Boski | |
| 4,519,575 A | 5/1985 | Akkerman et al. | |
| 4,523,639 A * | 6/1985 | Howard, Jr. ............ | E21B 29/08 251/1.3 |
| 4,651,970 A | 3/1987 | Sadler | |
| 4,744,386 A | 5/1988 | Frazer | |
| 5,178,360 A | 1/1993 | Young | |
| 5,535,828 A | 7/1996 | der Kinderen | |
| 8,141,641 B2 | 3/2012 | Chan | |
| 8,794,260 B2 | 8/2014 | Faillat | |

OTHER PUBLICATIONS

International Search Report and Written Opinion issued in PCT Application No. PCT/US2024/058406, dated Mar. 18, 2025.

* cited by examiner

*Primary Examiner* — Daphne M Barry
(74) *Attorney, Agent, or Firm* — Law Office of Darin Duphorne, PLLC

(57)　　　　　　ABSTRACT

A spring force assembly a sleeve coupled to a valve stem and configured to move axially along a valve axis responsive to movement of the valve stem. The spring force assembly also includes a collet positioned circumferentially about the sleeve, wherein an interface between the sleeve and the collet is used to transmit force from the sleeve to the collet. The spring force assembly further includes a spring configured to be compressed responsive to movement of the collet. Downward movement of the collet, responsive to movement of the sleeve, is configured to engage a portion of the actuator to mechanically lock the spring into a compressed position and to maintain the spring in the compressed position until upward movement of the sleeve, relative to the collet, releases the collet.

18 Claims, 8 Drawing Sheets

MECHANICALLY LOCKED ACTUATOR SYSTEM AND METHOD

BACKGROUND

1. Field of Disclosure

Embodiments of the present disclosure relate to valve systems, and in particular, to components that may be used to regulate valve actuators.

2. Description of Related Art

Valves are used in a variety of industries to regulate fluid flow. A variety of different actuating mechanisms may be used with different types of valves, such as manual actuators, electric actuators, hydraulic actuators, and/or pneumatic actuators. Certain actuators may be selected to enable certain operations, such as wire cutting during wellbore operations. These actuators generally require high spring forces in order to shear or cut a cable extending through a wellbore, and the force leads to large valves that are costly to build, operate, and maintain.

SUMMARY

Applicant recognized the problems noted above herein and conceived and developed embodiments of systems and methods, according to the present disclosure, for valve systems.

In an embodiment, a valve assembly includes a valve body. The valve assembly also includes a bonnet coupled to the valve body. The valve assembly further includes a valve stem extending along a valve stem axis through the bonnet. The valve assembly includes an actuator coupled to the bonnet, the actuator including a connector coupled to the valve stem such that driving movement of the actuator is translated to the valve stem. The valve assembly also includes a spring force assembly arranged within a body of the actuator. The spring force assembly includes a sleeve coupled to the valve stem and configured to move axially along the valve axis responsive to movement of the valve stem. The spring force assembly also includes a collet positioned circumferentially about the sleeve, wherein an interface between the sleeve and the collet is used to transmit force from the sleeve to the collet. The spring force assembly further includes a spring configured to be compressed responsive to movement of the collet. Downward movement of the collet, responsive to movement of the sleeve, is configured to engage a portion of the actuator to mechanically lock the spring into a compressed position and to maintain the spring in the compressed position until upward movement of the sleeve, relative to the collet, releases the collet.

In an embodiment, a spring force assembly includes a sleeve configured to move axially along a valve axis responsive to movement of a valve stem. The spring force assembly also includes a collet positioned circumferentially about the sleeve and configured to receive a force from the sleeve at a shoulder interface between the collet and the sleeve. The spring force assembly further includes a spring positioned radially outward from the sleeve and configured to move from an extended position to a compressed position responsive to movement of the collet. The spring force assembly includes a groove associated with a valve actuator to receive an expanding profile of the collet when the expanding profile is aligned with the groove, the expanding profile configured to be driven radially outward and into the groove by the sleeve.

In an embodiment, a method includes determining a desired spring closing force. The method also includes determining an actuator spring closing of an actuator spring to be used with an actuator for a valve assembly. The method further includes determining a spring force assembly closing force based, at least in part, on a difference between the desired spring closing force and the actuator spring closing force and a shear force for a component associated with the valve assembly. The method also includes positioning a number of spring assemblies within an actuator housing, wherein each spring assembly has an associated spring assembly closing force less than the spring force assembly closing force.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
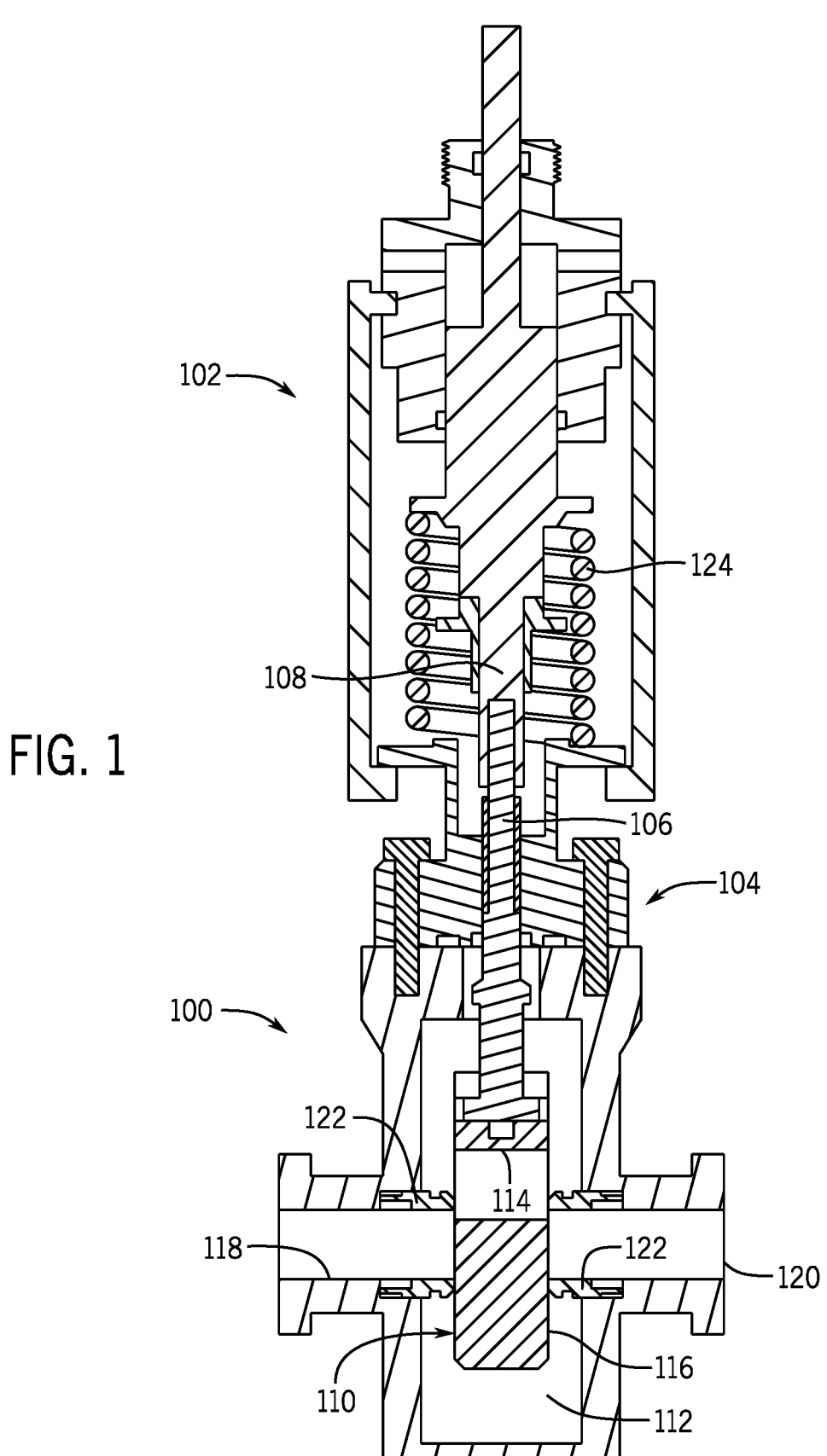
FIG. 1 is a schematic cross-sectional view of an embodiment of a valve assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, like reference numerals may be used for like components, but such use should not be interpreted as limiting the disclosure.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure. Moreover, references to "substantially" or "approximately" or "about" may refer to differences within ranges of +/−10 percent.

Embodiments of the present disclosure are directed toward valve configurations to provide additional energy to execute one or more wellbore operations, such as a wire cutting operation. Systems and methods of the present disclosure may be directed toward incorporating a one or more spring assemblies within an actuator to mechanically store and then apply the stored force responsive to a particular operation, such as a wire cutting operation. Various embodiments may include assemblies that include die springs stationed at different circumferential positions within an actuator housing. The die springs may be energized to a predetermined position to create a force for assistance during a particular operation. The position may be tunable/adjustable. Once the energized position is reached for the die springs, a mechanical operator may be used to maintain the spring force while normal valve operations continue without changing or otherwise interacting with the mechanical operator. By way of example, an expandable collet may be used to lock against a load shoulder on housing portion to maintain the position of the die springs. Upon activation, the collet may be released and extra force for use in cutting operations may be provided by the die springs. In this manner, smaller, cheaper springs may be used that are interchangeable and configurable for different operations.

In at least one embodiment, systems and methods may be used to retrofit and/to add functionality to one or more existing actuator systems. Furthermore, various embodiments may be provided with one or more quick connection systems in order to rapidly change out the actuator with an associated compatible base. The incorporation of the spring assemblies may enable a standard actuator spring (e.g., having a force output less than a threshold associated with a wire cutting actuator) to be used as a wire cutting actuator. In other words, embodiments may use a collection of smaller springs in a wire cutting capacity rather than a single large spring. The use of many small springs may reduce costs, both from an operational perspective and a manufacturing perspective, because standard components may be used, smaller bodies may be used, and a force to compress a large cutting spring with each operational movement may be eliminated. Various embodiments may be used to energize a set of smaller spring assemblies to a predetermined amount and then mechanically lock the smaller spring assemblies into position. Thereafter, normal valve operations may continue, and in the event a wire cutting operation is needed, the smaller spring assemblies may be activated along with the actuator spring, thereby collectively providing sufficient force to cut through a wire. Systems and methods reduce a footprint size and weight of a wire cutting actuator, provide for easier to source components, and also reduce operational costs.

FIG. 1 is a cross-sectional side elevation view of an embodiment of a valve assembly 100 that includes an actuator 102 coupled to a bonnet 104. The illustrated actuator 102 is coupled to a valve stem 106, via a connector 108, that extends through a central bore and couples to a valve member 110 arranged within a chamber 112. The illustrated valve member 110 includes a passage 114 and a block 116. As shown, fluid (e.g., gas, liquid, solid, or a combination thereof) may enter the valve 100 through an inlet passage 118 and engage the valve member 110 en route to an outlet passage 120. In the illustrated embodiment, the valve member 110 is transitioning between an open position, in which the passage 114 is substantially aligned with the inlet passage 118 and the outlet passage 120, and a closed position, in which the block 116 is substantially aligned with the inlet passage 118 and the outlet passage 120. The illustrated valve member 110 may seal against valve seats 122.

In operation, the actuator 102, which may be manual or automated (e.g., hydraulic, pneumatic, electric, etc.), drives movement of the valve member 110 between the open position and the closed position. When moving the valve member 110 from the closed position to the open position, the actuator overcomes an opposing force present in the valve 100 (e.g., the pressure of the fluid). Additionally, in at least one embodiment, the valve assembly 100 may be used with wellbore operations in which one or more components may pass through the flow bore, such as a wire used in "wireline" operations. This wire may be a variety of different sizes, such as one-eighth (⅛) of an inch, five-sixteenths (5/16) of an inch, seven-sixteenths (7/16) of an inch, or a variety of other sizes. During certain operations, such as an emergency shutdown, there may be insufficient to time remove the wire from the flow bore. As a result, it may be desirable to use an actuator 102 with sufficient closing force to shear or otherwise cut the wire, thereby enabling closure of the valve without removal of the wire. However, the wires used with these systems are often heavy, braided, reinforced lines that can withstand large closing forces.

A spring 124 within the actuator 102 may be sized and selected to permit cutting operations. The spring 124 may be selected based on a stored force (e.g., a spring force) that may be provided to uncoil the spring 124 after the spring 124 has been compressed. The spring 124 may be compressed during each stroke of the valve, which may require substantial amounts of force depending on the spring characteristics. For example, to enable cutting of the one-eighth inch wire, the spring force would need to be approximately 8,400 pounds. Moreover, to cut the five-sixteenths or the seven-sixteenths wires, the spring force may need to be greater, such as between 13,500 and 15,000 pounds for the five-sixteenths wire or between 18,500 and 20,000 pounds for the seven-sixteenths wire. Springs capable of generating this type of force are often large, hard to compress, and expensive to source. Embodiments of the present disclosure provide systems and methods to reduce a spring force required for the primary actuator spring by incorporating one or more spring assemblies within the actuator 102 to mechanically store a cutting force such that a smaller spring 124 may be used while still providing sufficient energy to cut through wires extending through the flow bore.

Figure 2A:
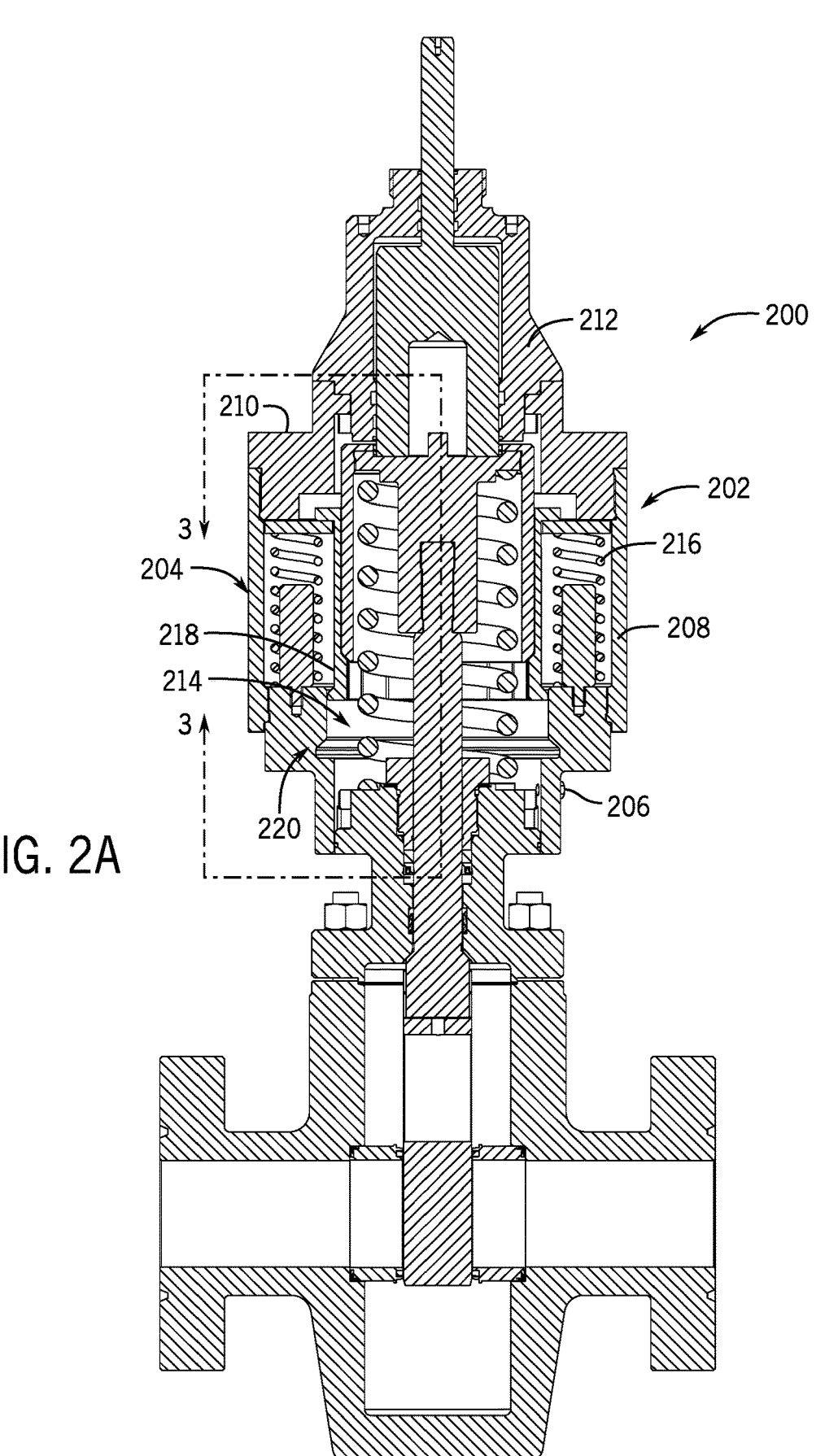
FIGS. 2A-2C are schematic cross-sectional views of embodiments of a valve assembly including a spring force assembly, in accordance with embodiments of the present disclosure.
Figure 2B:
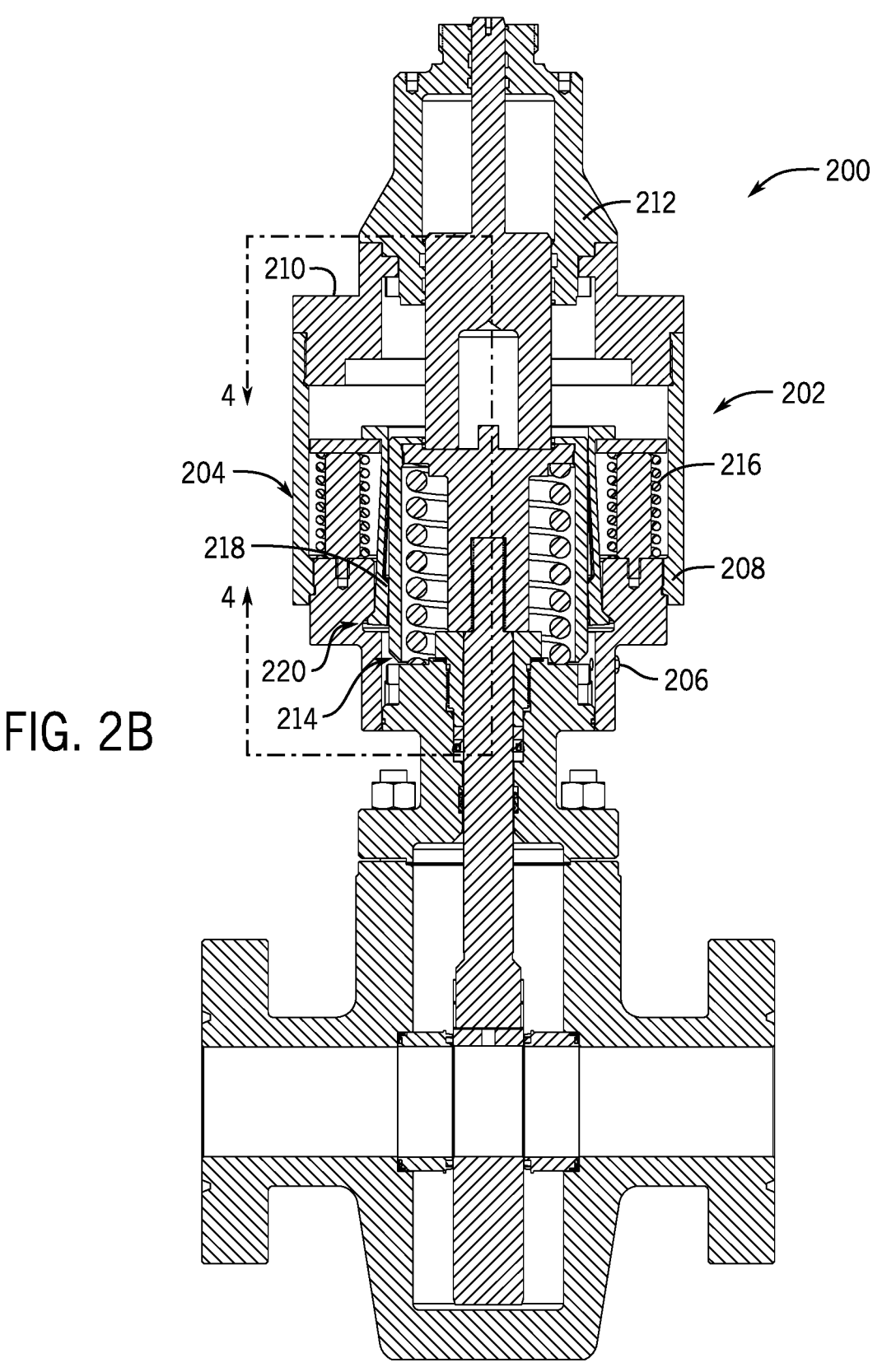
Figure 2C:
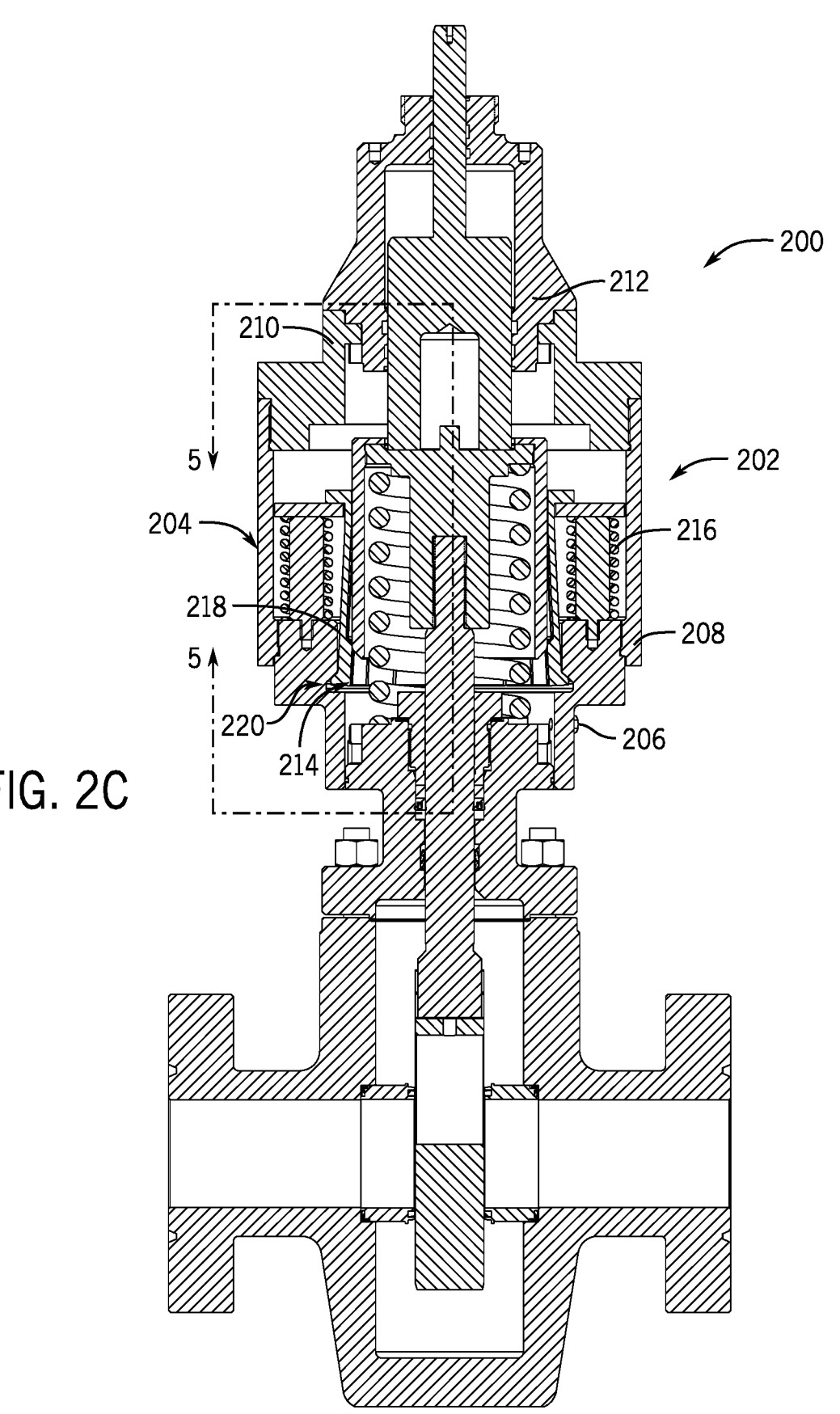

FIGS. 2A-2C are cross-sectional side views of an embodiment of a valve assembly 200, which may share one or more features with the valve assembly 100, incorporating a spring force assembly 202, in accordance with various embodiments. FIG. 2A illustrates the valve assembly 200 in a configuration where the spring force assembly 202 is disengaged, FIG. 2B illustrates the valve assembly 200 in a configuration where the spring force assembly 202 is engaged, and FIG. 2C illustrates the valve assembly in a configuration where the spring force assembly 202 maintains engagement during operation of the valve assembly 200.

In the examples, the spring force assembly 202 includes at least two spring assemblies 204, but it should be appreciated that various embodiments may incorporate more or fewer spring assemblies 204. The illustrated spring assemblies 204 are positioned at circumferential positions that are offset by 180 degrees from one another, thereby providing a balanced transmission of force during action. The current location is provided by way of non-limiting example and other numbers of spring assemblies 204 may change or modify circumferential positions. For example, three spring assemblies 204 may be arranged at positions that are approximately 120 degrees from one another and four spring assemblies 204 may be arranged at positions that are approximately 90 degrees from an adjacent spring assembly 204. Accordingly, as will be described herein, different numbers and positions of various spring assemblies 204 may be particularly selected based on one or more operating conditions. Furthermore, locations of the spring assemblies 204 may be selected to balance forces within the actuator housing.

In the illustrated embodiments, the spring assemblies 204 are mounted to an adapter ring 206 associated with the actuator 102 to couple the actuator 102 to the bonnet 104. The adapter ring 206 is coupled to an actuator body 208, which includes a top 210 and a cap 212. In at least one embodiment, the actuator body 208 and/or the adapter ring 206 may be coupled to mating components using one or more quick connection systems to facilitate coupling without using threaded fittings, such as bolts. In various embodiments, the quick connect system may also reduce a number of threaded fittings used. It should be appreciated that the quick connect system may include a coupling mechanism which may include features of the actuator 102, bonnet 104, and/or other connectors or components associated with the actuator 102 and/or the bonnet 104. Furthermore, in various embodiments, the adapter ring 206 may be a unitary piece with the actuator 102, for example, such that the actuator body 208 and the adapter ring are integrally formed. In that manner, the adapter 102 may be constructed with the spring force assembly 202 and/or may be retrofit to include the adapter ring 206 being coupled to an existing actuator body 208, among other options.

The illustrated spring assemblies 204 are positioned within an actuator cavity 214 and positioned radially outward from the spring 124. In operation, a motive element (e.g., gas, liquid, electricity, etc.) will drive the connector 108 in a downward direction, translating the movement to the valve stem 106 and the valve member 110. As a result of the movement of the connector 108, one or more resilient members of the spring assemblies 204, such as springs 216, will be compressed. Once activated, an associated spring force may be mechanically stored, as discussed herein, such that later movement of the connector 108 does not further compress or decompress the springs 216. For example, a collet 218 may be moved into position to engage a groove 220 (e.g., recess, etc.) within the adapter ring 206 to secure the springs 216 into a compressed position where force is stored and ready be released to drive the valve member 110.

Figure 3:
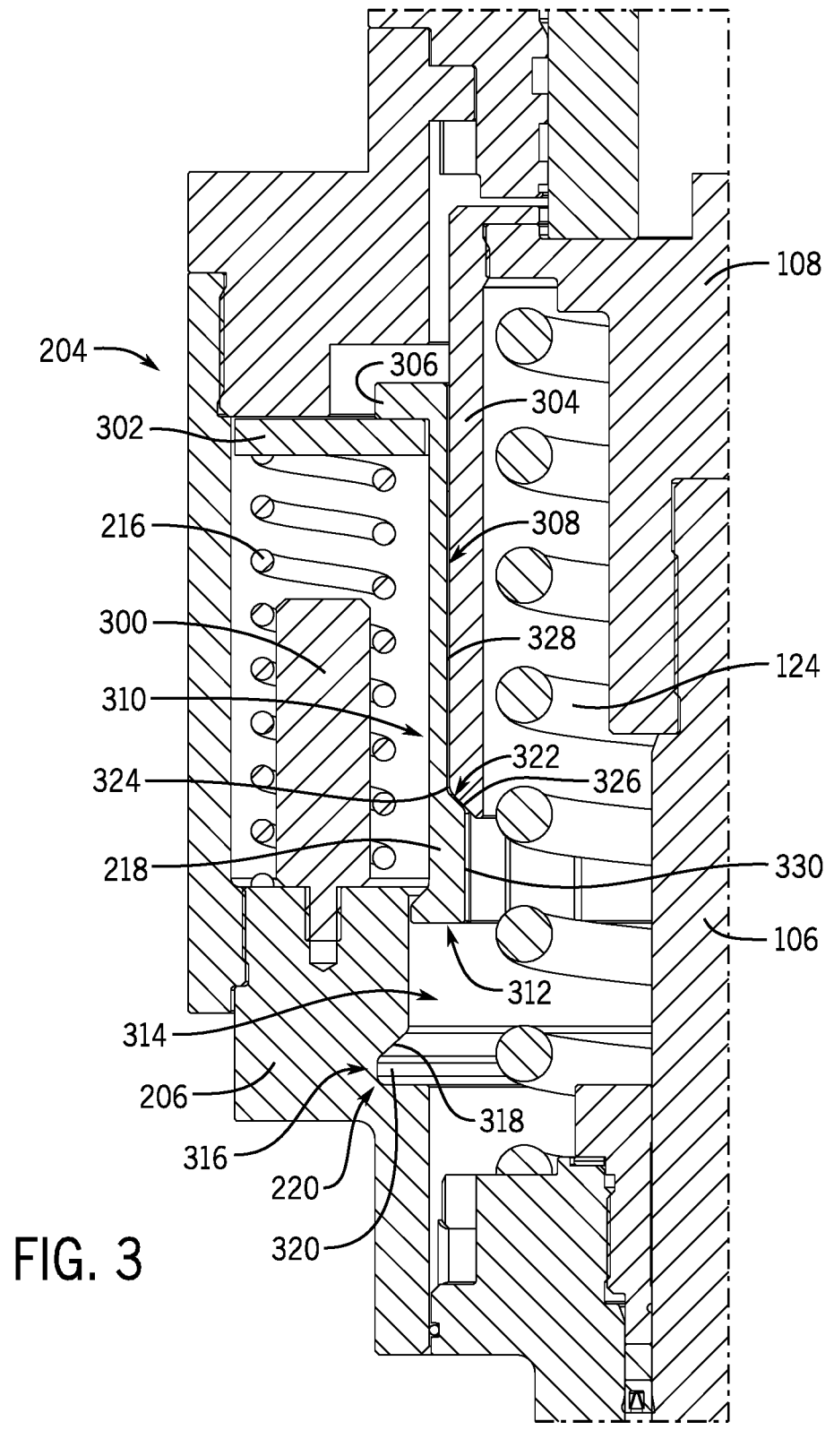
FIG. 3 is a detailed cross-sectional view of a spring assembly taken along 3-3, in accordance with embodiments of the present disclosure.

FIG. 3 is a detailed cross-sectional view taken along 3-3 of components associated with the spring assembly 204 of the present embodiments. Turning to a spring configuration, the spring 216 is positioned around a centralizer 300 that is coupled to the adapter ring 206. The centralizer 300 may be secured to the adapter ring 206 using one or more mechanical fasteners, such as threads, bolts, screws, etc., and/or using interference fits, adhesives, and/or the like. The spring 216 may be wound around and/or coupled to the centralizer 300, which may facilitate consistent compression of the spring 216 and, in certain embodiments, act as a down stop for the actuator 102.

In operation, a plate 302 may be coupled to the collet 218, which is driven in an axially downward direction (e.g., toward the adapter ring 206) responsive to movement of the valve stem 106. For example, a sleeve 304 may be coupled to the connector 108 and positioned radially inward from the collet 218 (e.g., closer to the valve stem 106). In one or more embodiments, the sleeve 304 may be threaded or otherwise mechanically coupled to the connector 108. Moreover, in at least one embodiment, the sleeve 304 and the connector 108 may be a unitary piece. It should be appreciated that a variety of configurations may be particularly selected based on one or more valve operating parameters, such as valves with single or multi-stroke configurations, among other considerations. Movement of the sleeve 304 may drive movement of the collet 218, which is translated to the plate 302 and compresses the spring 216. As noted herein, the collet 218 may then engage the groove 220, holding the collet 218 in position and preventing activation of the spring 216 (e.g., expansion of the spring 216) until activated for a cutting operation.

The collet 218 is shown as an annular component that includes an overhang 306 to engage the plate 302. In various embodiments, the overhang 306 may be coupled to the plate 302, for example using one or more threads or fasteners. In various other embodiments, the overhang 306 is selected to engage and compress the spring 216, via the plate 302, without mechanically coupling to the plate 302, such as by selecting a sufficient area of contact (e.g., exceeding a threshold amount for force transfer and to prevent bending or deformation of the collet and/or plate) between the overhang 306 and the plate 302. The illustrated collet 218 includes both inner and outer profiles 308, 310, where the inner profile 308 refers to the inner diameter of the collet 218 closet to the valve stem 106 and the outer profile 310 refers to the outer diameter of the collet 218 closest to the spring assembly 204.

Turning to the outer profile 310, the overhang 306 leads to a substantially linear region that extends along a length of the spring 216 and to an expanding profile 312 (e.g., a radially outward part of the collet 218, an expanding portion, etc.). The collet 218 may include a number of fingers (e.g., one finger, two fingers, three fingers, etc.) positioned circumferentially about the collet 218 such that individual fingers are separated by slots or cuts between adjacent fingers. The use of the fingers may enable flexing and movement of the individual fingers radially outward, as described herein. The expanding profile 312, in this example, is positioned radially outward from the linear region of the outer profile 310, extending toward the spring assembly 204, like the overhang 306. In certain embodiments, the expanding profile 312 extends radially outward as far as the overhang 306, but in this illustrated example, does not extend as far as the overhang 306. The position of the expanding profile 312 may be constrained, at least in part, by an adapter bore 314, which may be aligned with and coaxial with an axis of the valve stem 106. It should be appreciated that a diameter of the adapter bore 314 may be particularly selected based on one or more operating conditions and, in at least one embodiment, may be sized in accordance with one or more additional bores of the valve assembly 100. Furthermore, the adapter bore 314 may be sized based on dimensions of various other components, such as the collet 218 and/or the sleeve 304, among others. The expanding profile 312 in this example may contact or be closely positioned to an inner wall of the adapter bore 314. As shown, the adapter ring 206 includes the groove 220, which has a greater diameter than the adapter bore 314. In operation, as the collet 218 is driven in a downward direction, as described herein, the expanding profile 312 will be driven radially outward to engage the groove 220. After engaging the groove 220, the expanding profile 312 may be maintained within the groove 220 by the sleeve 304 until one or more actions cause the expanding profile 312 to move out of the groove 220, thereby releasing the stored force of the compressed spring 216, which as noted herein, will be compressed as the expanding profile 312 is driven axially downward through the adapter bore 314 and radially outward into the groove 220.

The groove 220 is shown having a groove profile 316 that includes a sloped region 318 and a recessed portion 320. It should be appreciated that the groove profile 316 is shown by way of example only and the sloped region 318 and recessed portion 320 are one configuration of a variety of different configurations that may be deployed to hold the expanding profile 312 in position. For example, the sloped region 318 may be stepped, which may include a variety of different slopes and/or straight (e.g., axially downward, radially outward, etc.) regions. Furthermore, the sloped region 318 may be curved or arcuate. Additionally, the sloped region may include an under cut, such as a region to receive an upward facing portion of the expanding profile 312. Furthermore, various combinations of these configurations may be deployed based on operating conditions, design considerations, manufacturing conditions, and/or the like. For example, an additively manufactured component may be capable of achieving more complex geometry compared to a machined component.

Regarding the inner profile 308, the illustrated configuration includes the collet 218 arranged circumferentially around the sleeve 304 such that at least a portion of the inner profile 308 conforms to an associated profile of the sleeve 304. The sleeve 308 is coupled to the connector 108 and extends laterally downward along the inner profile 308. The inner profile 308 includes a shoulder 322 (e.g., load shoulder, guide shoulder, activation shoulder, etc.), which in this example has a sloped surface 324. However, in various other embodiments, the shoulder and/or the sloped surface 324 may include one or more different configurations, such as a stepped profile, an arcuate profile, and/or the like. The sleeve 304 includes a mating surface 326 that interacts, at least in part, with the sloped surface 324. In the example of FIG. 3, a portion of the mating surface 326 overhangs or otherwise extends radially inward (e.g., toward the valve stem 106) and does not contact the sloped surface 324.

In operation, the interaction between the sloped surface 324 and the mating surface 326 transfers force applied to the sleeve 304 (e.g., via the connector 108) to the collet 218, driving the collet 218 in a downward direction (e.g., toward the adapter ring 206). Initially, the force is primarily in the downward direction due to the interaction between the adapter ring 206 and the expanding profile 312 such that radial forces, due to the sloped interface between the sloped surface 324 and the mating surface 326, may be resisted within the adapter bore 314. However, when the expanding profile 312 is aligned, at least partially, with the groove 220, the radial force at the interaction may drive the expanding profile 312 radially outward as the collet 218 flexes, thereby driving the expanding profile 312 into the groove 220. The continued movement of the sleeve 304 will further align a sleeve surface 328 with a collet surface 330, thereby maintaining the expanding profile 312 within the groove 220, as will be described herein. In this manner, as the sleeve surface 328 maintains contact with the collet surface 330, normal operation of the valve may continue while keeping the expanding profile 312 within the groove 220, thereby continuing to store the energy of the compressed spring 216. Under certain operating conditions, the sleeve surface 328 and the collet surface 330 may disengage, and therefore, the collet 218 may return to its original position, in which the expanding profile 312 moves radially inward, away from the groove 220, thereby releasing the stored energy of the spring 216, which increases a closing force of the valve assembly and may enable shearing or cutting of an associated wire within the flow bore.

Figure 4:
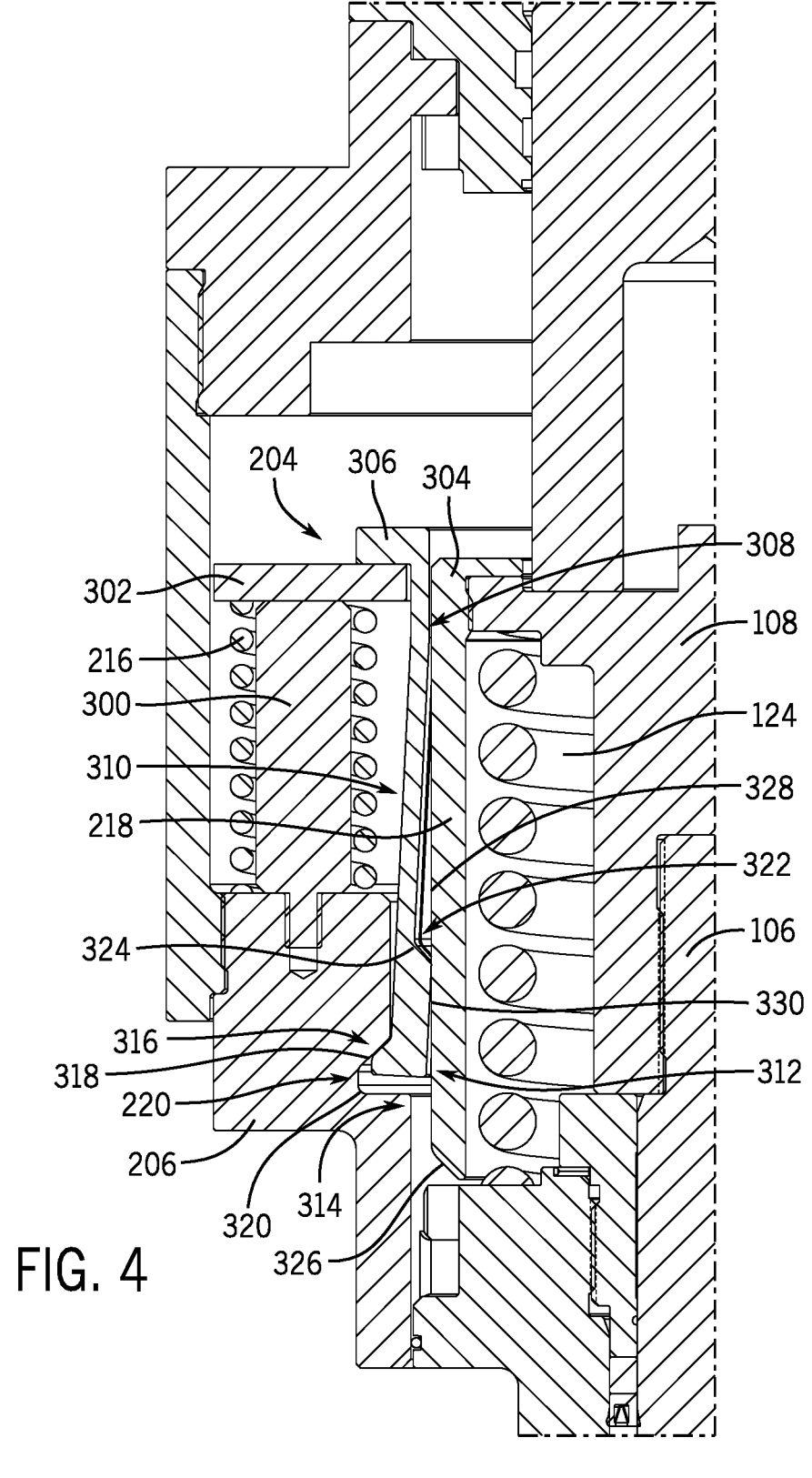
FIG. 4 is a detailed cross-sectional view of a spring assembly taken along 4-4, in accordance with embodiments of the present disclosure.

FIG. 4 is a detailed cross-sectional view taken along 4-4 of components associated with the spring assembly 204 of the present embodiments. In this example, the valve stem 106 has moved in a linearly downward direction and, responsive to that movement, the sleeve 304 has also driven the collet 218 in the downward direction. In the illustrated example, the collet 218 has been moved far enough that the expanding profile 312 aligns with the groove 220 and the collet surface 330 is aligned with and in contact with at least a portion of the sleeve surface 328, thereby driving the expanding profile 312 radially outward and into the groove 220 as the collet 218 flexes. Furthermore, the downward movement of the collet 218 has also been translated to the plate 302 via the overhang 306 to compress the spring 216. Accordingly, the illustrated embodiment shows the spring 216 in a compressed state and being secured in the compressed state by the expanding profile 312 being within the groove 220 and/or due to the position of the sleeve 304 relative to the collet 218 (e.g., with the sleeve surface 328 and the collet surface 330 in contact).

In the illustrated configuration, the valve assembly may be operated (e.g., moving the valve member 110) without disengaging the mechanical lock the collet 218 applies to the spring 216 as long as movement of the sleeve 304 does not move the mating surface 326 into alignment with the sloped surface 324 of the shoulder 322. In other words, the spring 216 will remain compressed and held in compression by the collet 218 until the sleeve 304 is moved to enable the expanding profile 312 to move out of the groove 220.

Figure 5:
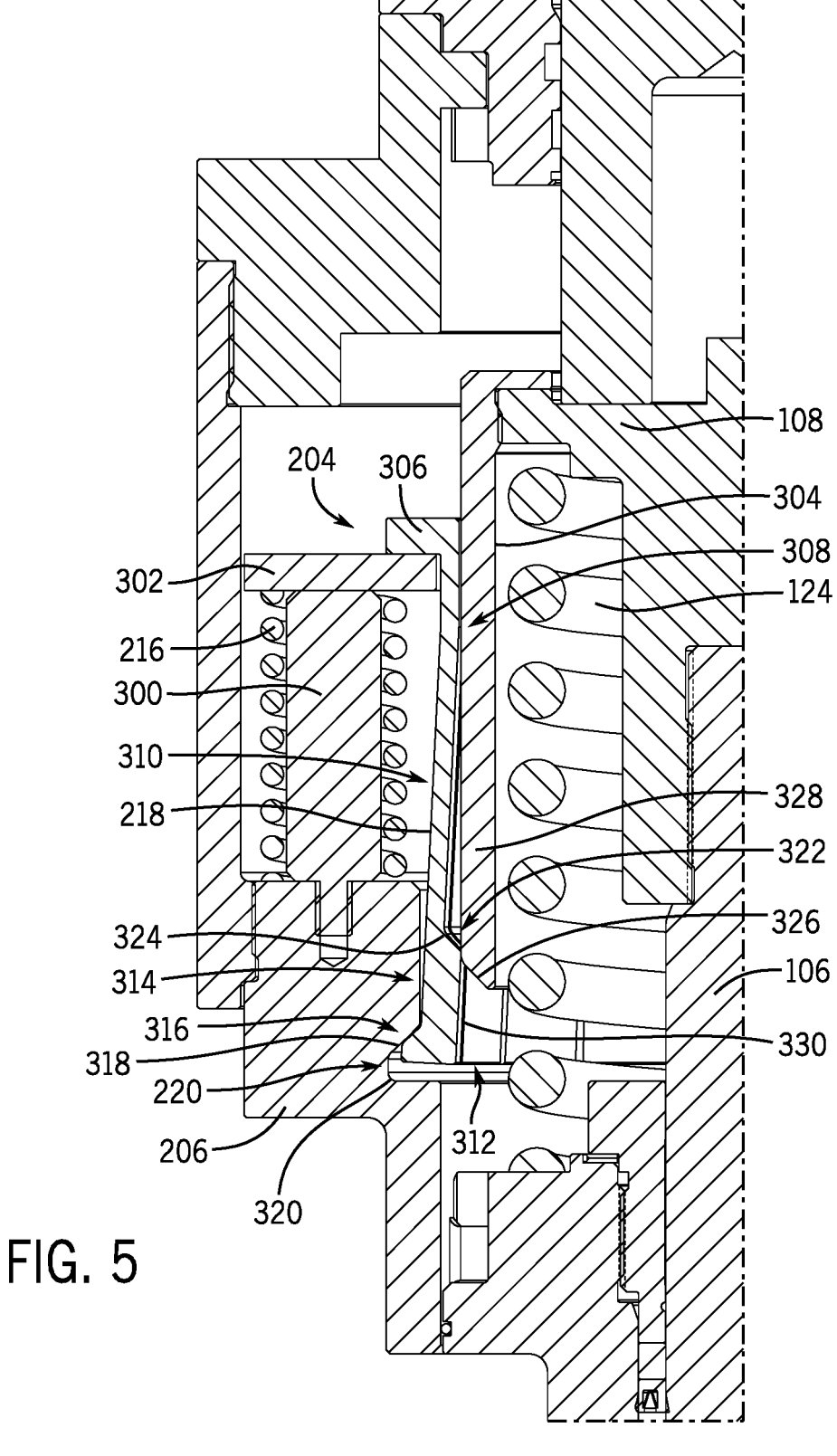
FIG. 5 is a detailed cross-sectional view of a spring assembly taken along 5-5, in accordance with embodiments of the present disclosure.

FIG. 5 is a detailed cross-sectional view taken along 5-5 of components associated with the spring assembly 204 of the present embodiments. In this example, the valve stem 106 has moved in a linearly upward direction, compared to the embodiment of FIG. 4. Responsive to that movement, the sleeve 304 continues to drive the collet 218 radially outward such that the expanding profile 312 aligns with the groove 220 and the collet surface 330 is aligned with and in contact with the sleeve surface 328, thereby driving the expanding profile 312 radially outward and into the groove 220 as the collet 218 flexes. Furthermore, spring 216 remains compressed by the collet 218, even as the sleeve 304 moves relative to the collet 218. Accordingly, the illustrated embodiment shows the spring 216 in a compressed state and being secured in the compressed state by the expanding profile 312 within the groove 220 and/or due to the position of the sleeve 304 relative to the collet 218 (e.g., with the sleeve surface 328 and the collet surface 330 in contact).

In the illustrated configuration, the valve assembly may be operated (e.g., moving the valve member 110) without disengaging the mechanical lock the collet 218 applies to the spring 216 as long as movement of the sleeve 304 does not move the mating surface 326 into alignment with the sloped surface 324 of the shoulder 322. In other words, the spring 216 will remain compressed and held in compression by the collet 218 until the sleeve 304 is moved to enable the expanding profile 312 to move out of the groove 220. In this example, the mating surface 326 has not engaged the sloped surface 324, and therefore, the lock remains engaged. However, if the sleeve 304 were to continue to move in an upward direction, the mating surface 326 would contact the sloped surface 324, which would remove at least a portion of the radial force driving the expanding profile 312 into the groove 220. Without that force, the collet 218 could return to its original position and disengage the mechanical lock to release the energy of the spring 216. Such a configuration may be provided to facilitate closure of the valve during an emergency scenario. By disengaging the lock, the spring force may be used to drive the valve to a closed position with sufficient additional force to shear and/or cut a wire within the flow bore. As noted herein, the extra force from the smaller springs 216 may be used in combination with the force from the spring 124 in provide a sufficient closing force that would normally require larger, heavier, and more expensive single spring configurations.

It should be appreciated that in various embodiment different configurations of the spring assembly 204 may be used to tune and/or adjust stored and/or applied forces of the spring assembly 204. For example, one or more dimensions or properties of the spring 216 may be particularly selected to provide a desired spring force. Additionally, a position of the groove 220 along a length of the adapter ring 206 may be adjusted to change where the groove 220 is engaged by the expanding profile 312, and therefore, to change how much compression is applied to the spring 216. For example, in the embodiments of FIGS. 4 and 5, if the groove 220 were higher (e.g., closer to the centralizer 300), then the spring 216 would be compressed less in the locked position. Furthermore, dimensions of the centralizer 300 may be selected to control how much compression is applied the spring 216. For example, in FIG. 5, the plate 302 contacts the centralizer 300 when the spring 216 is fully compressed. If the centralizer 300 were taller (e.g., a longer axial length), then the plate 302 would contact the centralizer 300 earlier, reducing compression on the spring 216. Similarly, the centralizer may be shorter (e.g., a shorter axial length), then the plate 302 may not contact the centralizer 300 when in compression and/or additional compression may be used.

As another non-limiting example, a thickness of the plate 302 (e.g., a length between a top surface closer to the top 210 and a bottom surface closer to the centralizer 300) may also be adjusted to reduce or increase compression applied to the spring 216. For example, a thicker plate 302 may lead to less compression if the centralizer 300 remains the same and/or a thinner plate 302 may lead to more compression. Accordingly, various systems and methods may particularly selected a desired compression for the one or more spring assemblies 204 and may tune and/or adjust various component dimensions to achieve the desired compression.

Figure 6:
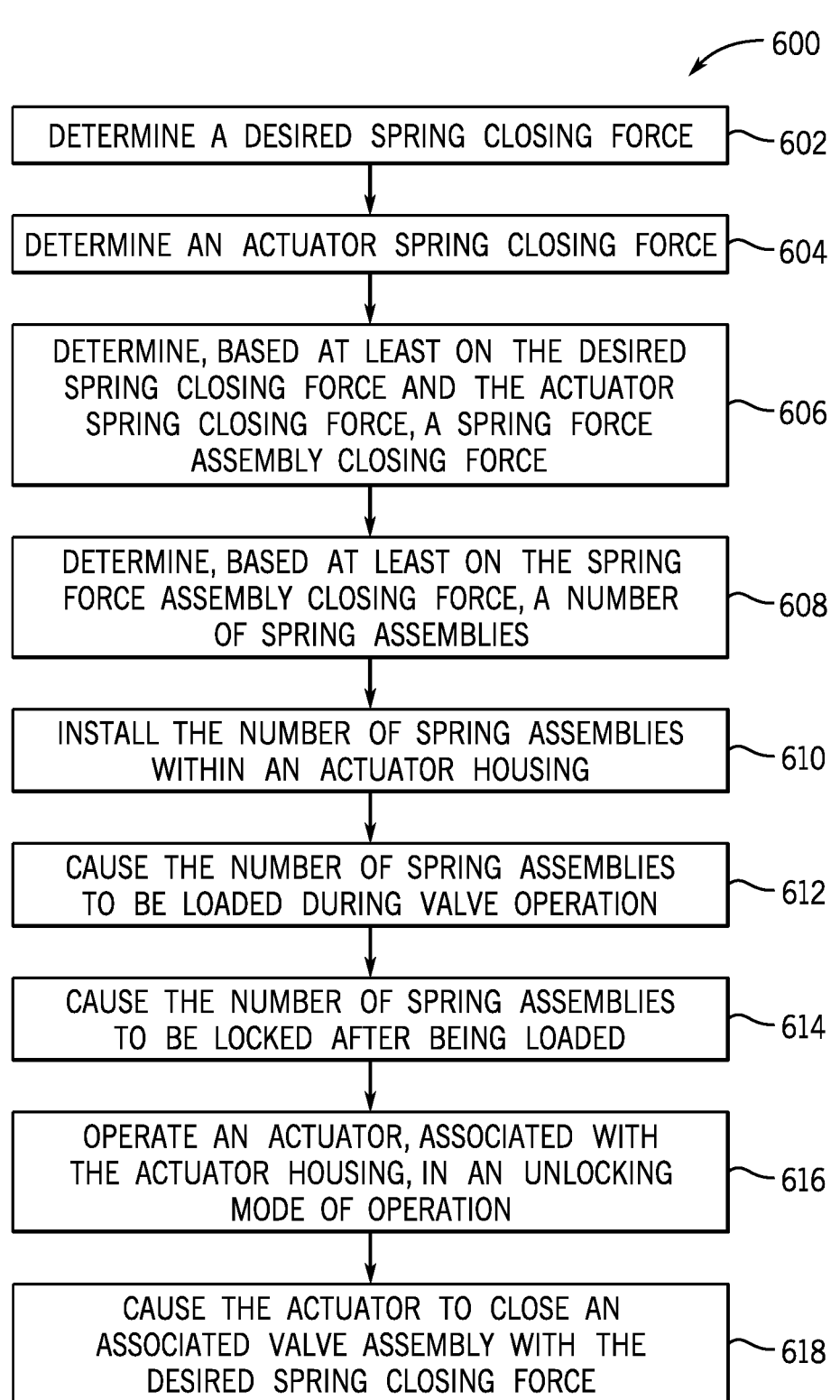
FIG. 6 is a flow chart of a method for a spring force assembly, in accordance with embodiments of the present disclosure.

FIG. 6 is a flow chart of a method 600 for compressing, storing, and apply a spring force, in accordance with various embodiments. It should be appreciated that steps for the method may be performed in any order, or in parallel, unless otherwise specifically stated. Moreover, the method may include more or fewer steps. In this example, a desired spring closing force is determined 602. The desired spring closing force may be based, at least in part, on expected operating conditions for a valve assembly. For example, the valve assembly may be used in operations that include a wireline extending through a flow bore and the desired spring closing force may correspond to a force sufficient to shear the wireline. An actuator spring closing force may be determined 604. In at least one embodiment, the actuator spring closing force is less than the desired spring closing force. It may be beneficial, with embodiments of the present disclosure, to use a smaller actuator spring, which may cost less and have a smaller footprint, and pair the actuator spring with a spring force assembly, as described herein. A spring force assembly closing force may then be determined 606. In at least one embodiment, the spring force assembly closing force may be a difference between the desired spring closing force and the actuator spring closing force. For example, if the desired force was 10,000 pounds and the actuator spring force was only 5,000 pounds, it may be desirable to select and size a spring force assembly with at least 5,000 pounds of spring force.

In one or more embodiments, a number of spring assemblies may be determined 608. For example, the spring force assembly may be comprised of a number (e.g., 1, 2, 3, 4, 5, 6, 7, 8, 9, 10, etc.) of individual spring assemblies, which may each have a die spring. By spreading out the force over a number of different assemblies, smaller, cheaper springs may be used while still providing the desired total spring closing force. The number of spring assemblies may be installed within an actuator housing 610 and then may be loaded during operation of the valve 612. For example, embodiments may include a collet that is used to compress the spring during a stroke of the valve and then to lock the spring in place when the collet reaches a preset position. The spring assemblies may then be locked into position 614 as normal valve operations continue. The valve may then be operated in an unlocking mode of operation 616, which may release the lock and cause the actuator to close, using the stored energy of the spring assemblies and the actuator spring, using the desired spring closing force 618. In this manner, smaller, lighter, cheaper actuators may be used while providing sufficient closing forces for desired wellbore operations.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A valve assembly, comprising:
a valve body;
a bonnet coupled to the valve body;
a valve stem extending along a valve stem axis through the bonnet;
an actuator coupled to the bonnet, the actuator including
a connector coupled to the valve stem such that driving movement of the actuator is translated to the valve stem; and
a spring force assembly arranged within a body of the actuator, the spring force assembly comprising:
a sleeve coupled to the valve stem and configured to move axially along the valve axis responsive to movement of the valve stem;

a collet positioned circumferentially about the sleeve, wherein an interface between the sleeve and the collet is used to transmit force from the sleeve to the collet and the collet is configured to flex radially outward responsive to movement of the sleeve past a threshold location; and a spring configured to be compressed responsive to movement of the collet;

wherein downward movement of the collet, responsive to movement of the sleeve, is configured to engage a portion of the actuator to mechanically lock the spring into a compressed position and to maintain the spring in the compressed position until upward movement of the sleeve, relative to the collet, releases the collet.

2. The valve assembly of claim 1, further comprising:

a plate positioned at a top end of the spring; and an overhang extending radially outward from the collet, wherein the overhang is configured to transmit a force, applied to the collet by the sleeve, responsive to movement of the valve stem to compress the spring.

3. The valve assembly of claim 1, further comprising:

an adapter ring coupled to at least a portion of the actuator, the adapter ring having a groove to receive an extension of the collet to mechanically lock the spring in the compressed position.

4. The valve assembly of claim 3, wherein the groove has a larger diameter than an adapter ring bore.

5. The valve assembly of claim 3, wherein the groove has a groove profile that conforms to a mating profile of the collet.

6. The valve assembly of claim 1, wherein the collet further comprises:

a shoulder on an inner profile; and a collet surface axially lower than the shoulder.

7. The valve assembly of claim 6, wherein the sleeve further comprises:

a mating surface configured to transmit a force to the collet responsive to downward movement of the valve stem; and a sleeve surface configured to contact and maintain the collet in a locked position such that an expanding profile of the collet is driven into a radial groove.

8. The valve assembly of claim 1, further comprising:

an actuator spring having a first actuator spring force, wherein the spring force assembly is configured to apply an assembly spring force to drive the valve stem toward a closed position and wherein the actuator spring force and the assembly spring force exceeds a threshold to shear a wireline associated with the valve assembly.

9. A spring force assembly, comprising:

a sleeve configured to move axially along a valve axis responsive to movement of a valve stem;

a collet positioned circumferentially about the sleeve and configured to receive a force from the sleeve at a shoulder interface between the collet and the sleeve, wherein the collet is configured to flex responsive to movement of the sleeve past a predetermined position;

a spring positioned radially outward from the sleeve and configured to move from an extended position to a compressed position responsive to movement of the collet; and a groove associated with a valve actuator to receive an expanding profile of the collet when the expanding profile is aligned with the groove, the expanding profile configured to be driven radially outward and into the groove by the sleeve.

10. The spring force assembly of claim 9, wherein the shoulder interface includes a sloped surface that is engaged by a mating surface of the sleeve.

11. The spring force assembly of claim 9, wherein a valve having the valve actuator includes a plurality of spring force assemblies within an actuator housing.

12. The spring force assembly of claim 9, wherein an axial position of the groove, relative to the spring, is particularly selected based on a desired compressive force of the spring.

13. The spring force assembly of claim 9, wherein the groove includes a groove profile and the expanding profile includes a mating profile configured to engage the groove profile when the expanding profile is driven into the groove.

14. The spring force assembly of claim 9, wherein the collet includes a collet surface axially lower than the shoulder interface that is configured to be engaged by at least a portion of the a sleeve surface to drive the expanding profile into the groove.

15. The spring force assembly of claim 14, wherein contact between the collet surface and the portion of the sleeve surface maintains the expanding profile within the groove as the sleeve moves axially between one or more positions.

16. A method, comprising:

determining a desired spring closing force;

determining an actuator spring closing force of an actuator spring to be used with an actuator for a valve assembly;

determining a spring force assembly closing force based, at least in part, on a difference between the desired spring closing force and the actuator spring closing force and a shear force for a component associated with the valve assembly; and positioning a number of spring assemblies within an actuator housing, wherein each spring assembly has an associated spring assembly closing force less than the spring force assembly closing force.

17. The method of claim 16, further comprising:

causing, during operation of the valve assembly, each spring assembly to be moved to a compressed position; and maintaining each spring assembly in the compressed position during normal operation of the valve assembly.

18. The method of claim 17, further comprising:

causing the valve assembly to operate in a shearing mode of operation; and causing each spring assembly to move from the compressed position to an operational position, wherein the each spring assembly provides a respective spring assembly closing force in combination with the actuator spring closing force to at least meet the shear force.

* * * * *